United States Patent [19]

Küsters et al.

[11] 4,296,537
[45] Oct. 27, 1981

[54] VARIABLE DEFLECTION ROLL CONTROLLED BY HYDRAULICALLY ACTUATED RECIPROCATING ELEMENTS

[75] Inventors: Eduard Küsters, Gustav-Fünders-Web 18, 4150 Krefeld, Fed. Rep. of Germany; Karl-Heinz Ahrweiler, Krefeld, Fed. Rep. of Germany

[73] Assignee: Eduard Küsters, Krefeld, Fed. Rep. of Germany

[21] Appl. No.: 81,327

[22] Filed: Oct. 3, 1979

[30] Foreign Application Priority Data

Feb. 14, 1979 [DE] Fed. Rep. of Germany ....... 2905542

[51] Int. Cl.³ .............................................. B21B 13/02
[52] U.S. Cl. ................................................ 29/116 AD
[58] Field of Search ............ 29/116 AD, 116 R, 122, 29/113 AD

[56] References Cited

U.S. PATENT DOCUMENTS

| | | | |
|---|---|---|---|
| 3,106,153 | 10/1963 | Westbrook | 29/116 AD X |
| 3,191,263 | 6/1965 | Kuehn | 29/122 X |
| 4,030,177 | 6/1977 | Hold | 29/116 AD |

*Primary Examiner*—Peter P. Nerbun
*Attorney, Agent, or Firm*—Kenyon & Kenyon

[57] ABSTRACT

A variable deflection roll is controlled by hydraulically actuated reciprocating elements extending along a fixed shaft inside a rotative shell and which when stressed by the force of the elements has a substantially uniform clearance from the shell's inside on its side against which the elements apply their force.

5 Claims, 6 Drawing Figures

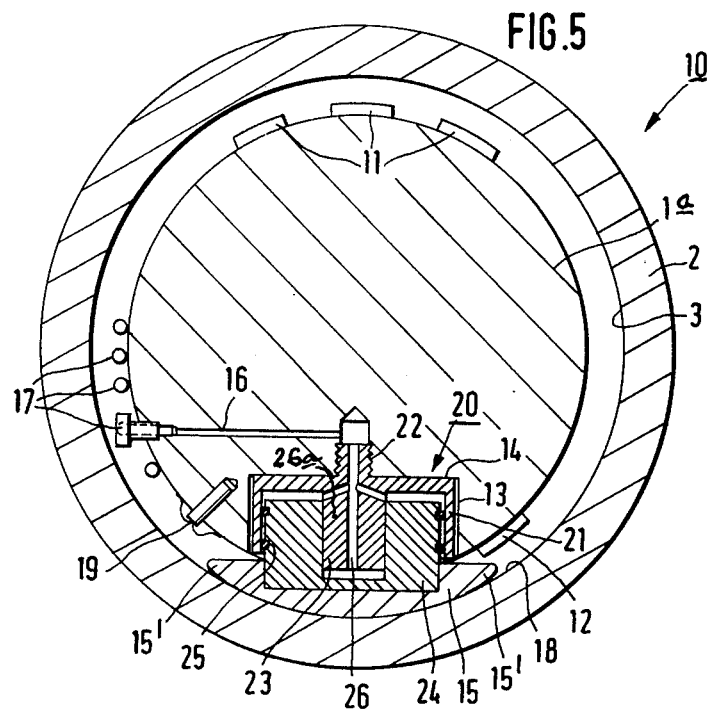
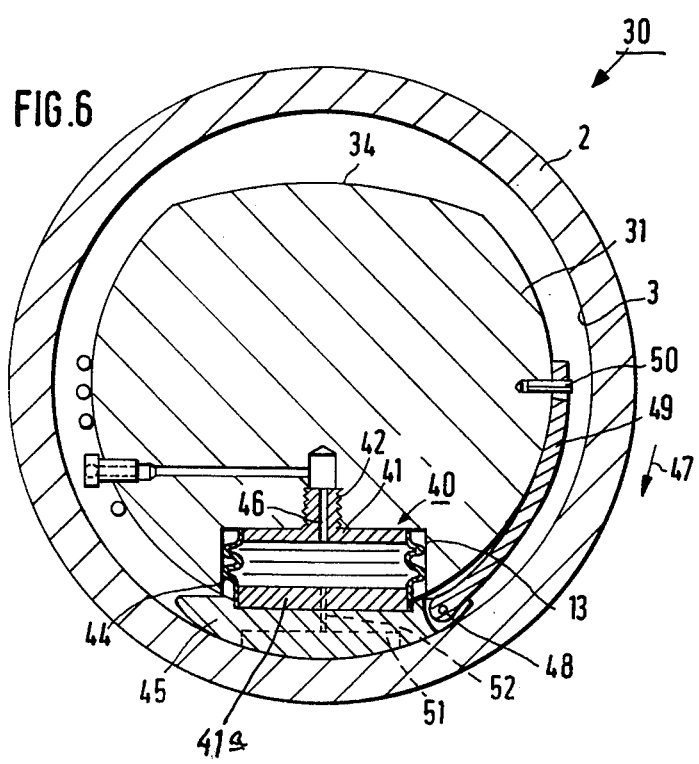

VARIABLE DEFLECTION ROLL CONTROLLED BY HYDRAULICALLY ACTUATED RECIPROCATING ELEMENTS

BACKGROUND OF THE INVENTION

One kind of hydraulically controlled variable deflection roll is disclosed by the 1964 Kusters et al U.S. Pat. No. 3,131,625.

This roll comprises a rotative shell forming an external work-rolling surface and a cylindrical inside. A fixed shaft extends through the shell's inside with radial clearance permitting independent transverse deflection of the roll and shaft. The shaft has a longitudinally extending series of radially extending cylinders formed by blind bores in the shaft. Each cylinder contains a single reciprocating piston for applying the roll deflection force between the shaft and the shell via a bearing shoe bearing on the shell's cylindrical inside.

When in use with the roll rotating against a counterroll to form a nip through which flat work can be rolled, hydraulic pressure is introduced uniformly to the cylinders so their pistons force the shoes against the shell's inside to control the shell's contour. The reaction is carried by the shaft which functions as a beam and consequently bends under the beam stress it receives, whether the roll's controlled contour is straight or curved.

Excepting for the cylindrical bores and relatively small hydraulic liquid feed passages to the various cylinders, the fixed shaft is made of solid metal. Its maximum diameter is limited by the need for clearance between it and the shell's inside. The radial extent or depth of the bores affect the beam strength and stiffness of the shaft, so it is desirable to have the bores as short or shallow as possible. It has been necessary to make the cylinders formed by the bores, and their pistons, of large diameter to provide adequate roll deflection force without using excessive hydraulic pressure.

It is common rule that to avoid a piston tilting or canting in its cylinder. The piston must have a guided length 1.5 times its diameter, necessarily requiring its cylinder to be substantially longer to accommodate the piston's working stroke. It follows that in the case of the described roll the bores forming the cylinders must extend undesirably far into the fixed shaft in its radial direction with a consequent undesirable reduction in the shaft's beam strength and stiffness.

One possibility for reducing the depth of the bores in the shaft might be to reduce the working stroke length of the pistons so their cylinders or shaft bores could be shortened, or to substitute for the cylinders and pistons shorter bores containing hydraulically actuated bellows arrangements.

However, with the fixed shaft functioning as a beam and bending under the beam stress, its central portion in particular substantially increases its spacing or clearance from the inside of the shell. To accommodate this, the pistons, at least those at or near the center of the fixed shaft, must have the long working stroke length, and bellows arrangements would be required to expand more than compatible with a bellows wall thickness withstanding the hydraulic pressures required. Such problems become more complex when the roll is working against a counterroll not provided with deflection control means and which itself bends so as to require the shell to correspondingly bend in a direction opposite from the shaft's bending direction.

It is possible to journal the shell either rotatively on the fixed shaft iself or independently of the shaft by bearings in a frame which mounts the shaft and the necessary counterroll. In the latter instance, the fixed shaft can be mounted by the frame so that at the shaft's ends it can be displaced upwardly or downwardly relative to the shell so as to thereby decrease the clearance between the shaft and the shell opposite to the counterroll on the working side of the shell where it externally forms the nip with the counterroll. However, reduction of the clearance between the shaft and the shell's inside effected in this way cannot compensate for the fact that the shaft bends under its beam strength. Any effort to reduce the clearance between the shaft and shell's inside at the central part of the controlled deflection roll can only result in the clearance at the ends of the roll being reduced to an unsafe value or possibly resulting in the shaft coming in contact with the roll's inside.

SUMMARY OF THE INVENTION

As a solution for the above indicated problems, the present invention uses a fixed or stationary shaft which when stressed by reacting to the force of the reciprocating elements working against the inside of the shell on its working or counterroll side, forms substantially a uniform clearance or interspacing from the shell's inside substantially throughout the extent of the series of elements or, in other words, substantially for the length of the shaft and shell. With this clearance held substantially uniform throughout the length of the shaft and shell, including their central portions where shaft bending is at its maximum, the hydraulically actuated reciprocating elements providing the variable roll deflection control, are required to operate throughout strokes of much less extent than is required when the clearance increases from the ends of the roll towards its central portion to there reach a maximum. Because of the reduced stroke length required, the cylinder bores can be shortened to reduce their weakening effect on the shaft, while still providing a piston guided length more than 1.5 times its diameter.

The fixed shaft can be provided with heating means for its side on the roll's working side and together with this or alternately the opposite side of the shaft can be provided with cooling means. In this way the fixed shaft by thermal expansion and/or contraction can be stressed to bow or bend in the direction of the roll's working side or side opposite to the counterroll when not stressed by the force of the reciprocating elements, the application of rolling pressure between the two rolls and of the hydraulic pressure behind the reciprocating elements causing the shaft to conform to the shape of the shell's inside so as to obtain the uniform clearance throughout the length of the shaft and roll.

Alternately, the shaft can be machined to have a somewhat barrel shape or to taper from its center towards its ends so that when subjected to beam stress, the shaft's side which receives the roll deflection control force more or less straightens so as to provide at least an approximation of a uniform clearance throughout the line or series of reciprocating force-creating elements. The clearance uniformity thus obtained is a substantial improvement.

DESCRIPTION OF THE DRAWINGS

FIG. 5 is a cross section taken on the line V—V in FIG. 2; and

FIG. 6 is a cross section taken on the line VI—VI in FIG. 3.

DETAILED DESCRIPTION OF THE INVENTION

Figure 1:
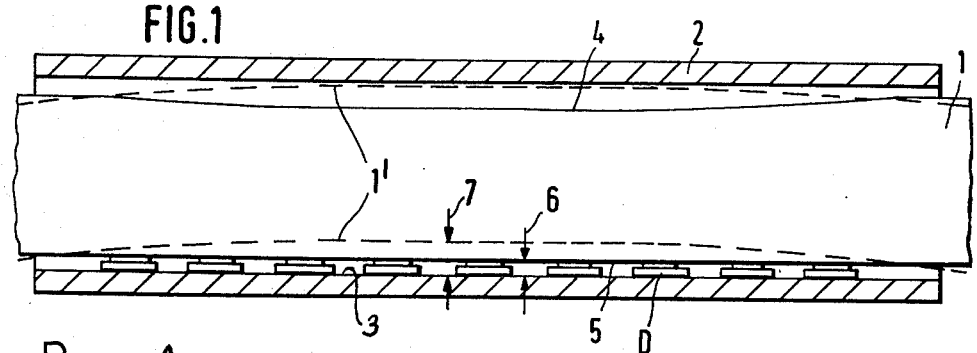
FIG. 1 is a longitudinal section showing a roll using the prior art type of fixed shaft.

FIG. 1 shows the prior art proposal with the fixed shaft 1 positioned inside of the shell 2, the shaft's reciprocatory force-creating elements D bearing on the cylindrical inside 3 of the roll shell 2 which, although not illustrated, would customarily externally bear against a counterroll below the shell 2 and form a rolling nip with the shell. The shaft 1 is fixed in the sense that it does not rotate, while the shell 2 is mounted by bearings (not shown), both components being positioned by the usual roll stand frame (not shown). The shaft 1 is cylindrical and straight, although possibly its upper side 4 may be made somewhat concave so as to provide additional clearance from the inside of the shell 2 when the shaft bends upwardly due to actuation of the elements D. When the roll components are unstressed, the shaft provides the clearance indicated by the arrows 6 uniformly throughout the length of the shaft and shell.

As previously indicated, when the elements D are actuated, to control the shell's contour, as for instance to keep it straight, the shaft 1 carries the reaction to the force exerted by the elements D and consequently bends upwardly as indicated by the dotted lines 1'. Now the clearance in the central portion of the roll has increased substantially as indicated by the arrows 7.

To exemplify the increase indicated by the arrows 7, hydraulically controlled variable deflection rolls using a solid shaft free from cylinder bores and having lengths of 8 meters or more, used as paper mill calender rolls, the shaft deflection at the center may be as much as 20 mm, even though the shafts are made of solid steel with a diameter as large as is possible consistent with clearance for the shaft deflection inside of the roll shell. Such rolls use side seals in accordance with the principles of the 1959 Appenzeller U.S. Pat. No. 2,908,964, but without the transverse bores shown by this patent. These commercial rolls are widely used and are made and sold under the trademark "Swimming Roll".

Figure 2:
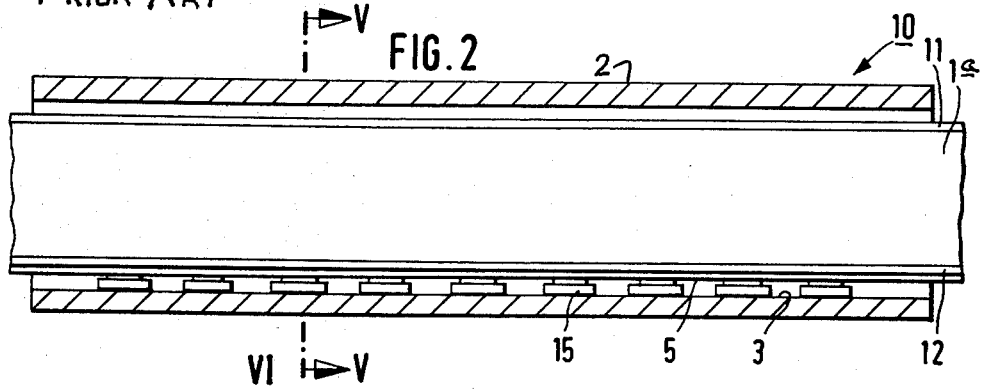
FIG. 2 is the same kind of view but shows an example of this invention.

In FIG. 2, the roll 10 embodies the principles of the present invention. The fixed or stationary shaft 1a can be straight and cylindrical throughout its beam-stressed extent. Its top is in contact with a longitudinally extending cooling means 11, such as a closed canal through which cooling water can be passed. Its bottom side is in contact with a longitudinally extending heating means 12 such as a closed canal provided with a fluid heating medium such as steam or hot water, or an electric heating element may be used.

With either or both of the means 11 and 12 working, the top of the shaft 1a becomes relatively colder while its bottom becomes relatively hotter, the resulting temperature differential thermally stressing the shaft 1a so that if free from the beam stress, it would be bowed upwardly. In other words, the shaft 1a is prestressed. Therefore, when loaded with the beam stress required to provide the reaction to the force required to keep the shell 2 in a straight condition for example, the prestressing of the shaft 1a can be controlled by control of the thermal cooling and heating means so that the shaft itself is also straight and free from deflection. In this way, under working conditions, the spacing shown at 6 in FIG. 1 can be kept as a substantially uniform clearance or space throughout the roll's length. The increase to the spacing 7 in FIG. 1 is prevented.

FIG. 5 shows the details which are not illustrated by FIG. 2. Here the roll 10 is shown with its shaft 1a inside of the shell 2 having the cylindrical inside surface 3. The bottom side of the shaft has a series of permissibly shallow recesses 13 formed by shallow blind bores in the shaft 1a, each of which has a flat bottom 14 on which a unit 20 is positioned. This unit comprises a cylinder 21 formed by a housing having a central nipple 22 threaded into a hole extending in the shaft upwardly from the recess 13. The cylinder contains a compound piston comprising a fixed piston 23 working inside a cylinder formed by a larger reciprocatory piston 24 reciprocating inside of the cylinder 21 and sealed by seals 25. Hydraulic pressure can be applied to each of the series of reciprocatory devices by branch lines 16 supplied from the end of the roll via tubes 17 extending longitudinally in the clearance space between the shaft and shell. This hydraulic pressure can act on the smaller piston via a passage 26 and on the larger piston via branch-lines 26a. The smaller piston is a fixed piston with the larger piston 24 being the reciprocating element which supplies the required force or pressure to the shoes 15 which are illustrated in both FIGS. 1 and 5. This shoe has chamfered ends as indicated at 15' so that lubricant introduced to the clearance space can form a film between the shoe and the shell's inside.

The cooling elements 11 are shown at the top in FIG. 5, the heating elements 12 are shown at the bottom of the shaft, and 19 indicates that pin-type heating elements might be inserted in bores formed in the shaft 1a.

Figure 3:
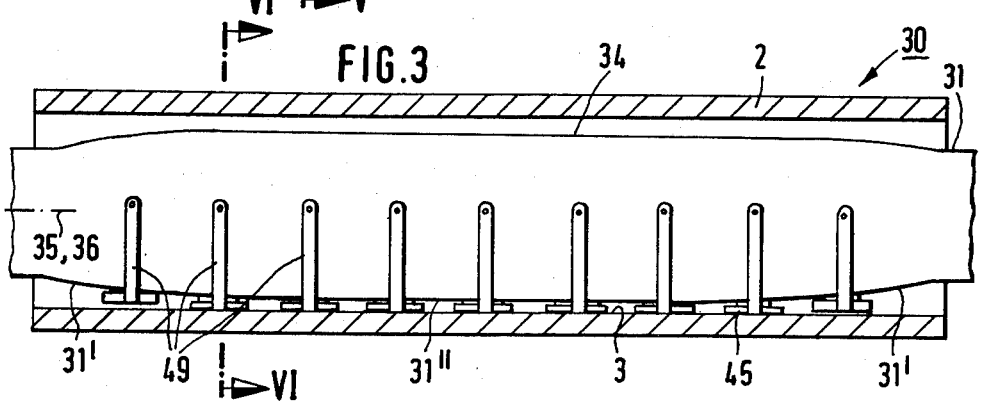
FIG. 3 is also the same kind of view but shows a second example of the invention with the shaft appearing as it is when unstressed by the reciprocating force-creating elements.

In the roll 30 of FIG. 3 the top side 34 of the fixed shaft is flattened because in this case the shaft is allowed to deflect upwardly. However, under working conditions, it is prestressed because, as shown, the fixed shaft 21 is tapered at its ends 31 so that it has more or less the form of a cigar having tapered ends. As can be seen in FIG. 3, where the roll is shown in its unloaded state, the ends 31' are spaced farther away from the inner periphery 3 of the rotative shell 2 than in the region 31" at the central portion of the roll. The dashed broken line 35–36 indicates that when unloaded or unstressed initially, the axes of the rotative shell 2 and of the fixed shaft 31 coincide with each other.

Figure 4:
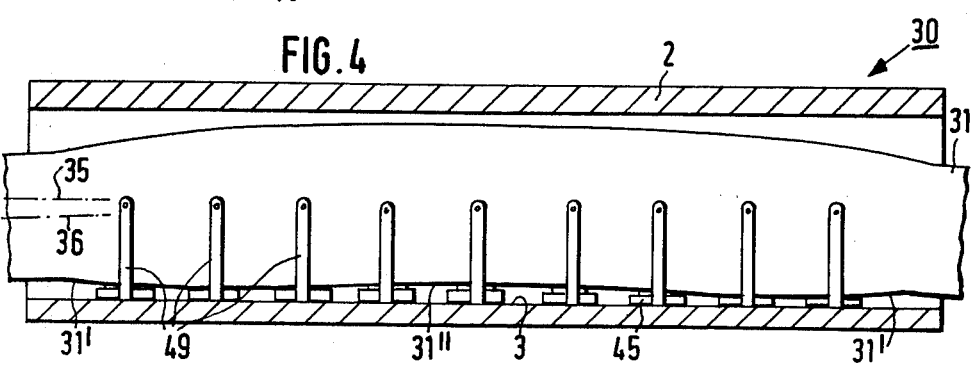
FIG. 4 is the same as FIG. 3 but shows the shaft conditions prevailing under working conditions.

When the deflection controlling forces are applied, as shown in FIG. 4, the fixed shaft 31 flexes under the beam stress so that as shown, the axes 35 and 36 no longer coincide, the fixed shaft now being upwardly curved but with the result that its bottom side, or pressure-receiving side 31" at least approximates parallelism with the inside of the rotative shell 2. If this distance is considered to be too great, the entire rotative shaft 31 can be shifted downwardly if it is assumed to be mounted by a roll stand for vertical movement independently with respect to the rotative shell 2 journaled by this frame.

It follows that in the case of the FIGS. 3–4 construction the spacing between the shaft 31 and the inside of the rotative shell 2 can be kept at a reasonably constant value throughout the length of the roll so that the reciprocative elements used to apply the roll deflection control pressure can have relatively short strokes, permitting the fixed shaft to be made with the largest possible diameter consistent with the inside diameter of the rotative shell.

The internal construction of the roll of FIGS. 3–4 is shown by FIG. 6 wherein the recesses 13 of FIG. 5 contain a somewhat different unit 40 comprising a metal bellows 44 closed at its upper end by a disk 41 having a threaded projection 42 screwed into a corresponding threaded bore formed in the shaft 31 somewhat in the manner of the nipple 22 of FIG. 5. This threaded projection 42 has a passage 46 leading to the interior of the metal bellows for the introduction of the hydraulic pressure. The bottom of the bellows is closed by a disk 41a which bears directly on the bearing shoe 45 which bears against the bottom or working side of the shell 2 on its cylindrical side 3.

In this case, the tendency for the shoe 45 to be dragged along by the rotation of the shell 2 is prevented, at least so far as excessive movement is concerned, in the direction of the arrow 47 by tie rods 49 anchored by pins 48 to the shoes of the various arrangements, and anchored to the fixed shaft 31 by pins 50.

Using the bellows 44, it can be seen that for them to be capable of resisting the necessary high hydraulic pressure involved, that the bellows wall thickness must be relatively thick, thus limiting the extent to which the plates 41a can be reciprocated. With the present invention the necessary stroke lengths can be kept within safe limits because with the thick shaft contoured as shown by FIGS. 3–4, there is no need for excessive stroke lengths throughout the length of the controlled deflection roll, even though in this case the side of the rotative shaft facing the working side of the rotative shell may not be precisely parallel with that side throughout.

It can be seen that under working conditions the fixed shafts in the roll forms of FIGS. 2 and 4 work under a prestressed condition counter to the beam stress received by the fixed shaft when the various reciprocating elements are powered to maintain the desired contour of the rotative shell, shown as straight in the drawings because there it is assumed that the illustrated roll is working against a counterroll of the same construction.

By use of the present invention, a controlled variable deflection roll using the reciprocating type of loading elements can be used effectively while at the same time permitting the fixed or stationary or non-rotative shaft receiving the beam stress, to be made with a diameter so large as to provide a beam strength and stiffness that is adequate to meet the requirement of even the long rolls used for paper calenders in paper mills and without this beam strength and stiffness being degraded by the need for radially deep recesses or cylindrical bores formerly necessary to provide the longer reciprocating strokes required particularly at the central portion of the fixed shaft. With this invention the working side of the shaft and roll can be maintained at least approximately parallel because of what can be called prestressing in a direction opposite to that with which the shaft is stressed when the roll is working.

As illustrated by FIG. 6, a flat chamber 51 is formed inside the pressure member 45. This chamber 51 communicates with the inside of bellows 44 through a throttling passage 52. In this manner, pressure fluid is supplied to the flat chamber 51 to act as a hydrostatic support at that point.

What is claimed is:

1. A hydraulically controlled variable deflection roll comprising a rotative shell having an external workrolling surface and a cylindrical inside, a fixed shaft extending through said inside with radial clearance permitting independent bending of the roll and shaft, said shaft having on one side a longitudinally extending series of blind bores extending radially into the shaft and containing reciprocating elements having outer sides connecting with bearing shoes bearing on the shell's said inside, and means for introducing hydraulic pressure behind said elements so that said shoes apply outwardly directed force to the shell's inside and stressing said shaft with force in a direction away from the shell's said inside on which said shoes bear, said shaft, shaped so as to taper towards its ends and bulge toward its middle, whereby when said shaft is stressed by said force, its said side will form substantially a uniform clearance from the shell's said inside substantially throughout the extent of said series of elements.

2. A roll according to claim 1, wherein said shaft has an approximately cigar shape.

3. A roll according to claim 1 wherein said reciprocating elements comprise metal bellows having their axes lying in the direction of said outwardly directed force.

4. A roll according to claim 1 wherein said reciprocating elements comprise piston and cylinder units disposed with their axes in said direction of said outwardly directed force.

5. A roll according to claim 1, 3 or 4 and further including a flat closed recess in said bearing shoes and a passage for admitting a fluid pressure medium under pressure into said recess.

* * * * *